United States Patent
Roberts et al.

(10) Patent No.: US 8,824,645 B2
(45) Date of Patent: Sep. 2, 2014

(54) VIDEO MESSAGING SYSTEMS AND METHODS

(75) Inventors: Brian F. Roberts, Dallas, TX (US); Anthony M. Lemus, Irving, TX (US); Japan A. Mehta, Coppell, TX (US); Kishore Tallapaneni, Flower Mound, TX (US); Donald H. Relyea, Dallas, TX (US); Sudhanshu Sharma, Lansdale, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 306 days.

(21) Appl. No.: 13/250,929

(22) Filed: Sep. 30, 2011

(65) Prior Publication Data

US 2013/0083906 A1   Apr. 4, 2013

(51) Int. Cl.
*H04M 11/00* (2006.01)
*H04N 7/14* (2006.01)
*H04L 12/58* (2006.01)
*H04N 21/4788* (2011.01)

(52) U.S. Cl.
CPC ............ *H04M 11/00* (2013.01); *H04N 7/147* (2013.01); *H04L 51/10* (2013.01); *H04N 21/4788* (2013.01)
USPC .................. 379/88.13; 348/14.01; 348/14.06; 379/88.17; 379/88.22; 455/412.1; 709/203; 709/206

(58) Field of Classification Search
CPC ............. H04M 1/253; H04M 1/2535; H04M 1/65–1/658; H04M 3/50; H04M 3/51; H04M 3/5141; H04M 3/53–3/537; H04M 7/0024–7/0057; H04M 2203/30–2203/308; H04M 2203/45–2203/459; H04N 7/14–7/148
USPC ........... 348/14.1–14.16; 370/259–271, 370/351–357; 455/575.1–575.9, 90.1–90.3, 455/412.1–426.2, 456.1–560; 709/201–207, 217–248; 379/67.1–88.28, 201.01; 704/270–278
See application file for complete search history.

(56) References Cited

U.S. PATENT DOCUMENTS

| | | | |
|---|---|---|---|
| 7,003,724 B2 * | 2/2006 | Newman | 715/273 |
| 7,110,510 B1 * | 9/2006 | Shaffer et al. | 379/88.25 |
| 7,222,156 B2 * | 5/2007 | Gupta et al. | 709/206 |
| 7,421,690 B2 * | 9/2008 | Forstall et al. | 718/100 |
| 7,769,144 B2 * | 8/2010 | Yao et al. | 379/88.13 |
| 7,984,098 B2 * | 7/2011 | Enete et al. | 709/204 |
| 2004/0133647 A1 * | 7/2004 | Ozkan et al. | 709/206 |
| 2004/0221323 A1 * | 11/2004 | Watt | 725/135 |

(Continued)

OTHER PUBLICATIONS

Youtube, Upside Down, 2 pages, http://www.youtube.com/watch?v=pNlmn7vbXBQ, as accessed on Sep. 30, 2011.

(Continued)

*Primary Examiner* — Hemant Patel

(57) ABSTRACT

An exemplary method includes a video messaging system 1) providing an asynchronous video messaging service, 2) maintaining communication thread data representative of a video communication thread that includes a plurality of video messages exchanged between users of the asynchronous video messaging service, 3) providing a user interface configured to facilitate user interaction with the video communication thread, 4) receiving, by way of the user interface, a user input command to process multiple video messages included in the video communication thread, and 5) stitching together the multiple video messages for use in processing the multiple video messages in response to the user input command. Corresponding systems and methods are also disclosed.

25 Claims, 13 Drawing Sheets

(56) References Cited

U.S. PATENT DOCUMENTS

| | | | |
|---|---|---|---|
| 2006/0123347 A1* | 6/2006 | Hewitt et al. | 715/748 |
| 2006/0253787 A1* | 11/2006 | Fogg | 715/752 |
| 2007/0061738 A1* | 3/2007 | Taboada et al. | 715/752 |
| 2007/0130580 A1* | 6/2007 | Covell et al. | 725/18 |
| 2008/0090553 A1* | 4/2008 | Wan et al. | 455/413 |
| 2009/0292738 A1* | 11/2009 | Hurwitz | 707/200 |
| 2010/0242074 A1* | 9/2010 | Rouse et al. | 725/100 |
| 2011/0246890 A1* | 10/2011 | Mellamphy et al. | 715/719 |
| 2012/0110096 A1* | 5/2012 | Smarr et al. | 709/206 |
| 2012/0124147 A1* | 5/2012 | Hamlin et al. | 709/206 |
| 2012/0148034 A1* | 6/2012 | Ferguson | 379/88.14 |
| 2012/0189282 A1* | 7/2012 | Wyatt et al. | 386/278 |
| 2012/0284343 A1* | 11/2012 | Lee et al. | 709/206 |
| 2012/0317210 A1* | 12/2012 | Fisher et al. | 709/206 |

OTHER PUBLICATIONS

Youtube, Upside Down, 1 page, http://www.youtube.com/video_response_view_all?v=pNlmn7vbXBQ, as accessed on Sep. 30, 2011.

* cited by examiner

VIDEO MESSAGING SYSTEMS AND METHODS

BACKGROUND INFORMATION

Real-time video communications services, such as real-time video calling services, are increasingly being used for interpersonal communications. Such real-time video communications services require synchronicity in that the participants in a real-time video communication session must be available to concurrently participate in the communication session. Unfortunately, certain users who want to communicate using video may find the synchronicity requirement of real-time video communications services to be inconvenient, undesirable, burdensome, and/or difficult to satisfy for certain situations.

Users have leveraged other traditional communication services to send and receive video content. For example, a user may attach a video file to an email message, text message, or digital message board post. However, in such uses of communication services, text rather than video is typically the primary medium or basis of interpersonal communications between users of the services. Such traditional communications services are not well-suited and/or not tailored to video communications. Moreover, traditional communications services that are used to send and receive video as attachments lack capabilities, features, and/or user interfaces for producing quality user experiences related to creating, viewing, and/or otherwise processing the video attachments.

Video sharing services allow users of the services to share videos with other users of the services. For example, a user may upload a video to a video sharing service such as YouTube. Once the video has been uploaded, other users of the video sharing service may access and view the video. However, in such video sharing services, videos are not threaded for interpersonal communications, and for at least this reason, such video sharing services do not provide true interpersonal communication threads or experiences for users. For example, such video sharing services do not support interpersonal communications in a way that would allow users to create and participate in a directed, back-and-forth video conversation. In addition, existing video sharing services lack capabilities, features, and/or user interfaces for producing quality user experiences related to creating, viewing, and/or otherwise processing shared video content in the context of an interpersonal video communication thread.

For at least these reasons, new and/or improved video messaging services, capabilities, features, and/or user interfaces are desired.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary video messaging systems and methods are described herein. In certain examples, the video messaging systems and methods may provide an asynchronous video messaging service and one or more features, functions, and/or user interfaces configured to facilitate user interaction with the video messaging service and/or processing of video messages included in a video communication thread of the video messaging service. Such video messaging systems and methods, which are tailored for threaded video communications, may provide one or more users of the video messaging service with one or more capabilities, features, functions, user interfaces, and/or processes that are not provided by conventional communications or video sharing services and that may produce quality user experiences related to creating, exchanging, consuming, and/or otherwise processing video messages included in a video communication thread of the video messaging service. These and/or other benefits provided by the disclosed exemplary video messaging systems and methods will be made apparent herein. Examples of video messaging systems and methods will now be described in reference to the accompanying drawings.

Figure 1:
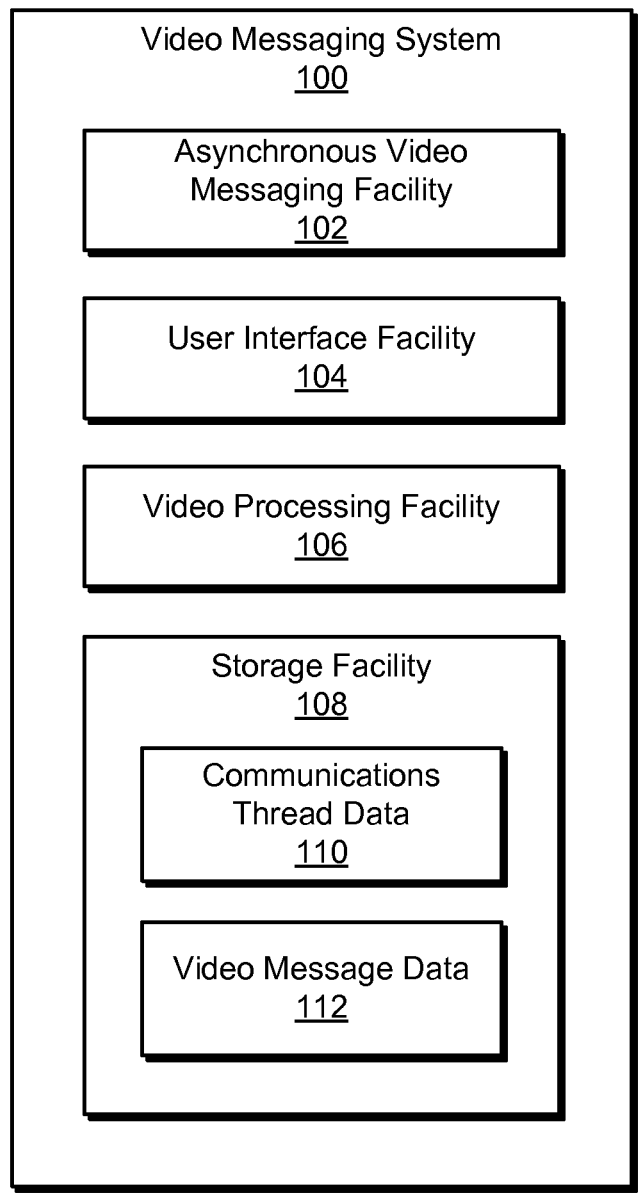
FIG. 1 illustrates an exemplary video messaging system according to principles described herein.

FIG. 1 illustrates an exemplary video messaging system 100 (or simply "system 100"). As shown, system 100 may include, without limitation, an asynchronous video messaging facility 102 (or simply "video messaging facility 102"), a user interface facility 104, a video processing facility 106 (or simply "processing facility 106"), and a storage facility 108, which may be in communication with one another using any suitable communication technologies. It will be recognized that although facilities 102-108 are shown to be separate facilities in FIG. 1, any of facilities 102-108 may be combined into fewer facilities, such as into a single facility, or divided into more facilities as may serve a particular implementation.

Data generated and/or used by system 100 may be stored in storage facility 108. For example, storage facility 108 may store communications thread data 110 representative of and/or otherwise related to one or more video communications threads included in a video messaging service provided by system 100 and video message data 112 representative of one or more video messages exchanged by way of the video messaging service. Examples of communications threads, communications thread data 110, video messages, and video message data 112 are described herein. Additional and/or alternative data may be stored by storage facility 108 in other embodiments.

Video messaging facility 102 may be configured to provide an asynchronous video messaging service. Through the service, video messages may be asynchronously exchanged between users of the service. The service is asynchronous in that video messages may be exchanged between users without time interdependencies. For example, the service is not subject to a synchronicity requirement that would otherwise require concurrent participation of users communicating with one another by way of a traditional real-time video communication service such as a real-time video calling service.

Accordingly, users of the asynchronous video messaging service may exchange video messages without time interdependencies between the video messages and without having to concurrently participate in a real-time video communication session.

The asynchronous video message service may support asynchronous exchange of video messages between user devices, users, and/or components of the service in any suitable way that allows the exchange to be asynchronous. In certain embodiments, the video messaging service includes a point-to-point video messaging service in which video messages may be asynchronously exchanged between targeted end users and/or endpoint user devices (e.g., by the endpoint user devices sending and receiving the video messages between the endpoint user devices). Such point-to-point video messaging services may allow video messages to be directly or indirectly (through a communications server and/or other network node device) sent and received between target endpoint user devices in the context of a specific video communications thread. In certain other embodiments, the video messaging service includes a hosted video messaging service in which video messages may be asynchronously exchanged by way of a host location and in the context of a specific video communications thread. For example, the video messaging service may include an online video message board service to which users may post video messages to a specific video communications thread of the service for access by one or more users having access to the thread.

As mentioned, a video messaging service provided by video messaging facility 102 may include one or more video communication threads. As used herein, a video communication thread refers to a grouping of one or more video messages that is representative of a chain of video communications exchanged between users of a video messaging service. For example, a video communication thread may include video messages exchanged over time by particular users (e.g., between two specific users or between more than two specific users) via the service. As another example, a video communication thread may include video messages exchanged by particular users in the context of a particular messaging topic (e.g., a thread topic).

Figure 2:
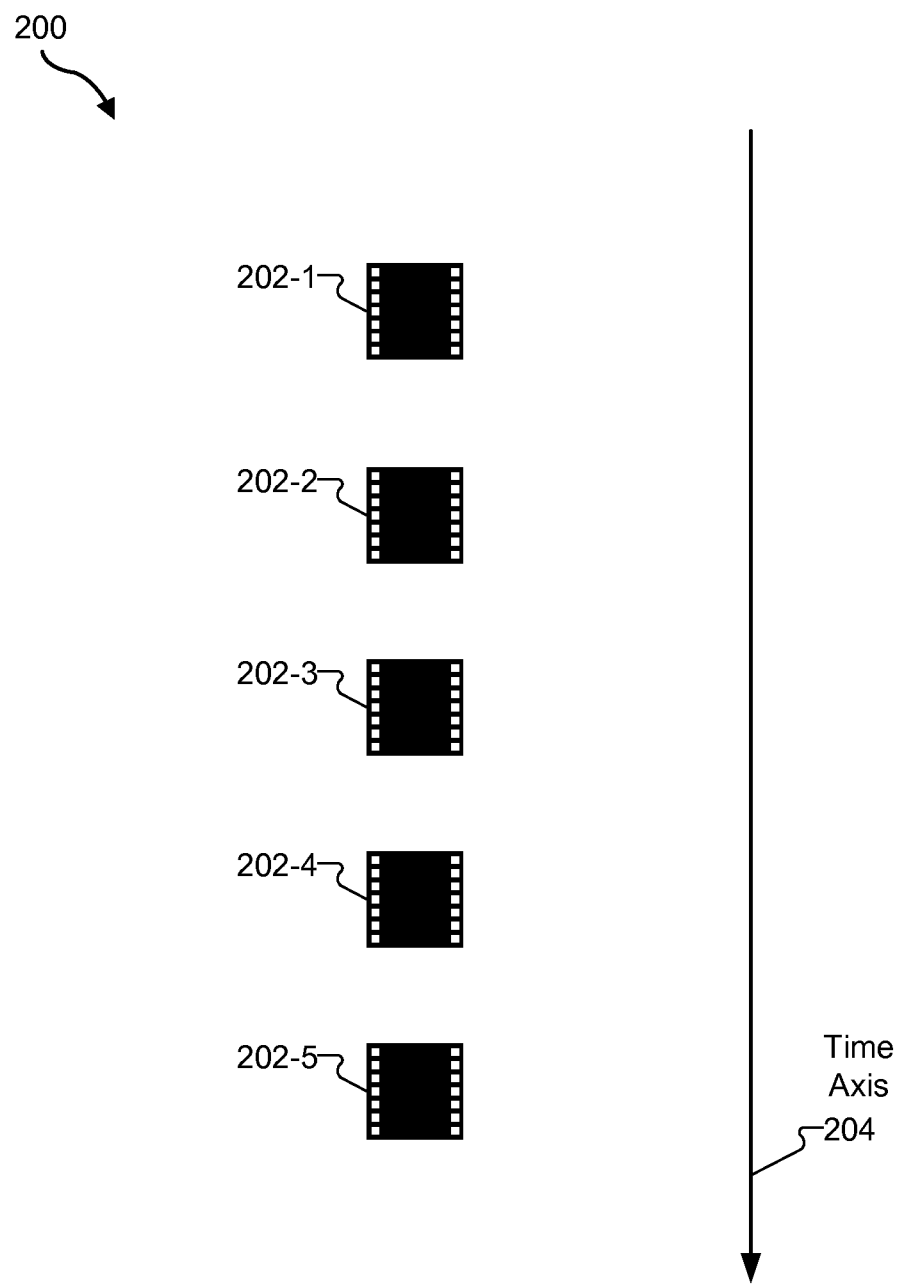
FIG. 2 illustrates an exemplary video communication thread according to principles described herein.

To illustrate, FIG. 2 shows an exemplary video communication thread 200 that includes a chain of video messages 202 (e.g., video messages 202-1 through 202-5) exchanged asynchronously over time by particular users via an asynchronous video messaging service. In FIG. 2, the chain of video messages 202 is arranged in the chronological order in which the video messages 202 are exchanged. Message 202-1 is first in time in the chain, and message 202-5 is last in time in the chain, as indicated by time axis 204.

Video messaging facility 102 may be configured to associate video messages exchanged between users with appropriate video communication threads. For example, video messaging facility 102 may detect that video messages 205 are to be associated with thread 200 based on data related to the video messages 205, such as the sender, receiver, subject, and/or message reply data of the video messages 205. To illustrate, when each of the video messages 205 is exchanged (e.g., sent and/or received) between specific users, video messaging facility 102 may associate each video message with thread 200 based on the specific users involved in the message exchange. As another example, when each of the video messages 202 is exchanged between users, such as when each of the video messages is posted to an online video message board, for instance, video messaging facility 102 may associate each video message with thread 200 based on each video message 202 being posted in a directed manner specifically to thread 200, to a specific topic (e.g., a topic thread of an online video message board), or in reply to another specific video message 202 that is included in thread 200.

Video messaging facility 102 may maintain communication thread data 110 representative of a video communication thread such as thread 200. Communication thread data 110 may include any information descriptive of and/or related to a video communication thread. For example, communication thread data 110 may include, without limitation, identifiers and/or other information descriptive of the video messages included in a thread, time information (e.g., timestamps) descriptive of when video messaging activities such as exchanges of video messages and/or association of video messages with the thread occurred, user identifiers such as identifiers of senders, receivers, and/or posters of the video messages included in a thread, user-generated labels or descriptions of the video messages, chain information descriptive of relationships between video messages in a thread (e.g., information indicating that a video message is a reply to another specific video message in a thread), a topic of a thread, and any other information descriptive of a video communication thread.

Video messaging facility 102 may also maintain video message data 112 representative of video messages included in a thread. Video message data 112 may include any video content data and/or information descriptive of or related to video content included in video messages. For example, video message data 112 may include video content data representative of video content included in one or more video messages and metadata that indicates one or more attributes of the video content in the video messages (e.g., duration, data format, codec, etc. of each video message).

Figure 3:
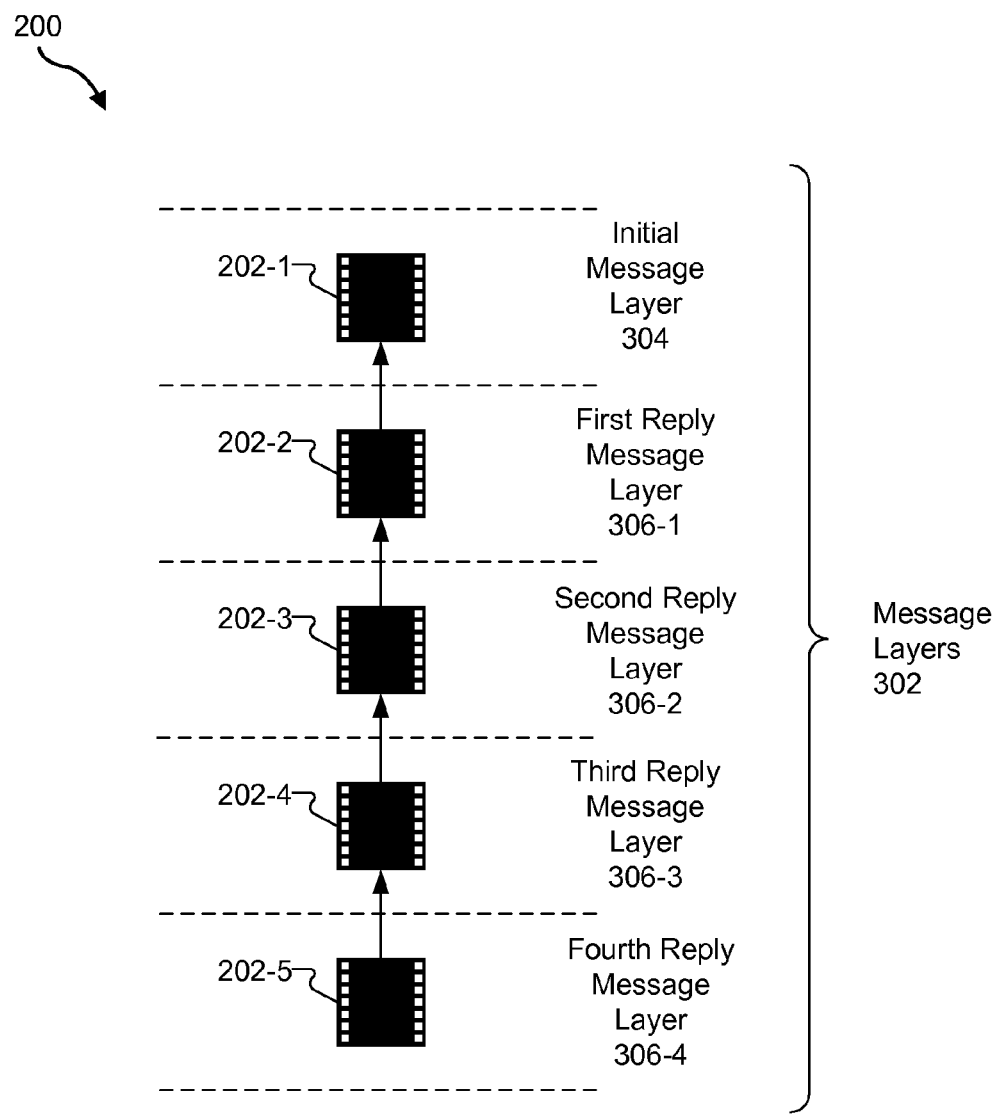
FIG. 3 illustrates exemplary message layers of the video communication thread of FIG. 2 according to principles described herein.

In certain embodiments, video messages included in a video communication thread may be organized into message layers. To illustrate, FIG. 3 shows exemplary message layers 302 of video communications thread 200. Message layers 302 may be hierarchical and may be associated with message exchange times and/or message reply chains of the video messages 202 included in thread 200. For example, message layers 302 may comprise an initial message layer 304 that includes the initial video message 202-1 added to thread 200. Message layers 302 may further contain reply message layers 306 (e.g., reply message layers 306-1 through 306-4) that include video messages that are replies (direct or indirect) to the initial message 202-1. Reply layer 306-1 may include any video messages that are direct replies to the initial message 202-1, reply layer 306-2 may include any video messages that are direct replies to message 202-2, and so on. In the illustrated example, message 202-2 may be a first level reply to the initial message 202-1 and may therefore be included in first reply layer 306-1, message 202-3 may be a second level of reply to the initial message 202-1 (e.g., by being a direct reply to message 202-2) and therefore included in second reply layer 306-2, message 202-4 may be a third level of reply to the initial message 202-1 (e.g., by being a direct reply to message 202-3) and therefore included in third reply layer 306-3, and message 202-5 may be a fourth level of reply to the initial message 202-1 (e.g., by being a direct reply to message 202-4) and therefore included in fourth reply layer 306-4.

Thread 200 is illustrative of one of many possible video communications threads that may be created and maintained by video messaging facility 102. Other threads may include other numbers and/or organizations of one or more video messages. For example, thread 200 includes only a single branch of successive reply messages 202-2, 202-3, 202-4, and 202-5 in a chain of video messages 202. Other exemplary threads may include multiple branches of reply messages in a chain of video messages.

Figure 4:
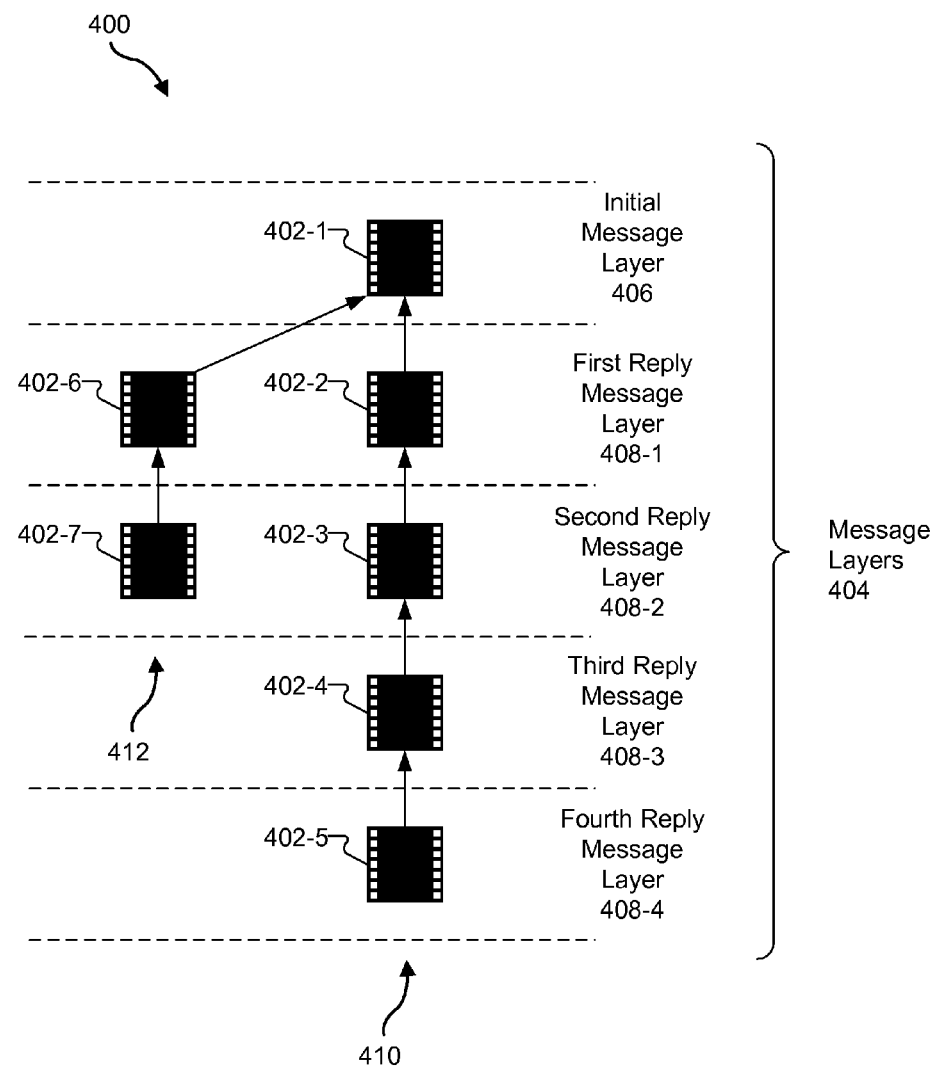
FIG. 4 illustrates another exemplary video communication thread according to principles described herein.

To illustrate, FIG. 4 shows another exemplary video communication thread 400 that includes a chain of video messages 402 (e.g., video messages 402-1 through 402-7) asynchronously exchanged over time by particular users via an asynchronous video messaging service. Video messages 402 are organized into hierarchical message layers 404, including an initial message layer 406 and hierarchical reply message layers (e.g., reply message layers 408-1 through 408-4) as shown in FIG. 4.

Thread 400 includes two branches of reply messages. A first branch 410 includes successive reply messages 402-2, 402-3, 402-4, and 402-5 branching off of initial message 402-1. A second branch 412 includes successive reply messages 402-6 and 402-7 branching off of initial message 402-1. Thread 400 is one example of a thread having multiple branches of reply messages. Other configurations of video messages and branches may be included in other threads.

In each video communications thread included in a video messaging service provided by video messaging facility 102, one or more video messages included in the thread are the primary medium and/or basis of communications exchanged between users of the video messaging service. Accordingly, one or more features, functions, and/or user interfaces provided by system 100 may be tailored for interfacing with and/or processing data associated with each video communication thread.

A video communication thread may be associated with any number of users of a video messaging service. In some examples, a video communication thread may be individual in that only a single user has provided video messages included in the thread. In such examples, the user may utilize the thread to exchange messages with himself or herself, such as for creating a journal or project of video messages. In other examples, a video communication thread may be a group thread in that a group of users has provided media messages included in the thread. In such examples, the group of users may utilize the thread for collaborative video discussions and/or projects.

Returning to FIG. 1, user interface facility 104 may be configured to provide a user interface configured to facilitate user interaction with a video messaging service provided by video messaging facility 102, including interaction with video communications threads and video messages associated with the service. Accordingly, through the user interface, a user of the video messaging service may interact with the video messaging service and video communication threads and video messages associated with the service, such as by providing user input commands to process one or more video messages included in a video communication thread. Examples of such interactions may include, without limitation, interactions directed to consuming video messages, creating video content from video messages, augmenting video messages and/or video content created from video messages, sharing video messages and/or video content created from video messages, and creating and posting new video messages.

User interface facility 104 may provide one or more user interface tools for use by a user to interact with the service. Exemplary graphical user interfaces ("GUIs"), user interface tools, and interactions with a video messaging service by way of a user interface will now be described in reference to FIGS. 5-8, which illustrate views of exemplary GUIs provided by user interface facility 104 and through which users may interact with the video messaging service.

Figure 5:
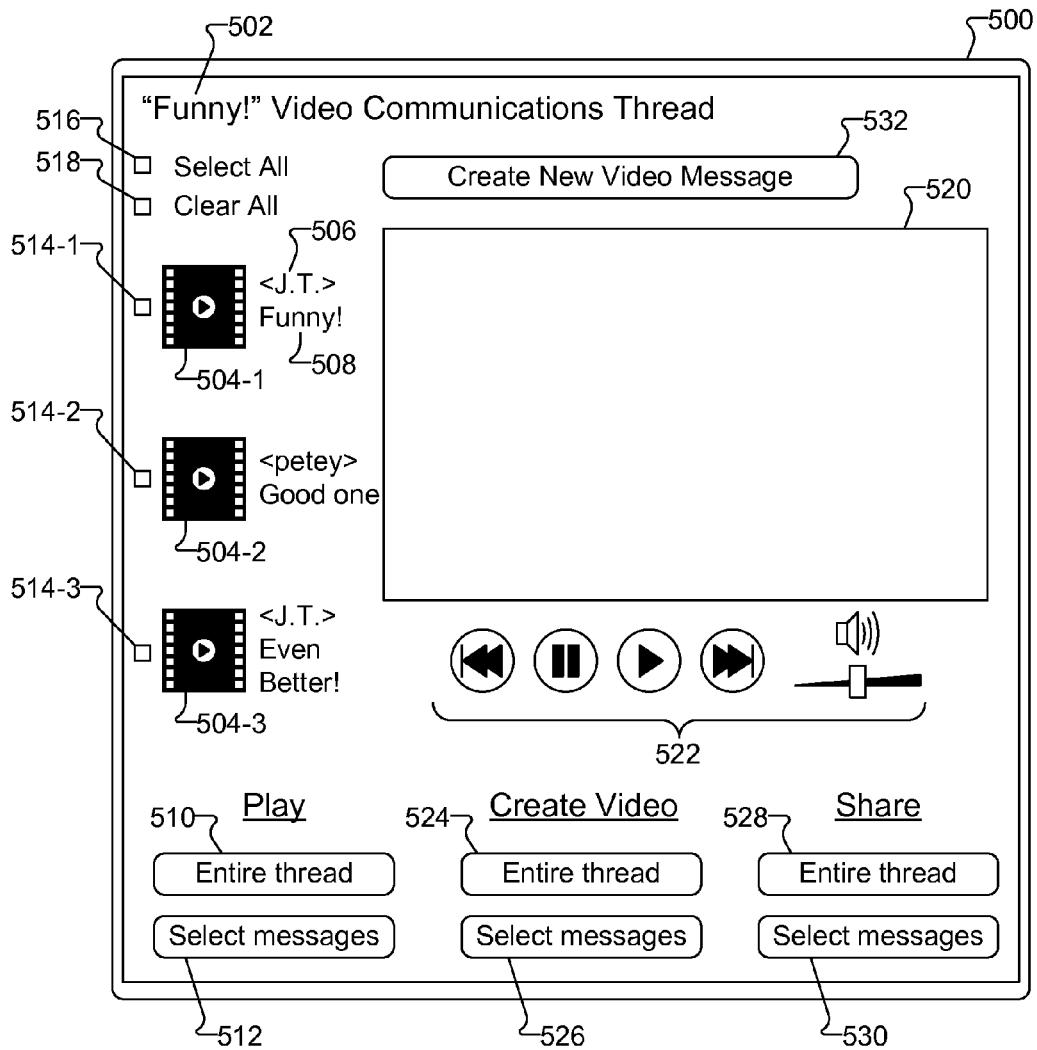
FIGS. 5-8 illustrate exemplary graphical user interfaces according to principles described herein.

FIG. 5 illustrates an exemplary GUI 500 configured to facilitate user consumption of video messages included in a video communications thread. As shown, GUI 500 may include a visual indicator 502 of a video communications thread (e.g., a thread titled "Funny!") that is the current focus of GUI 500. GUI 500 may include visual indicators 504 (e.g., visual indicators 504-1 through 504-3) of one or more video messages included in the thread. GUI 500 may additionally indicate certain information associated with each of the video messages. For example, for the video message associated with visual indicator 504-1, an indication of a username 506 (e.g., "J.T.") of the user who posted video message 504-1 and a user-created label 508 (e.g., "Funny!") for video message 504-1 are displayed next to visual indicator 504-1.

GUI 500 may provide one or more tools for use by a user to consume one or more video messages included in the thread. For example, each of the visual indicators 504 may be selected by the user to initiate individual playback of the corresponding video message. GUI 500 may also provide enhanced playback tools such that the user is not limited to individual playback of the video messages. For example, GUI 500 may provide one or more tools for use by the user to initiate continuous playback of multiple video messages included in the thread. In the illustrated example, GUI 500 includes a selectable option 510 that may be selected by the user to initiate continuous playback of all of the video messages included in the thread. Such continuous playback may be referred to as "threaded playback" of the video messages included in the thread. GUI 500 may additionally or alternatively include a selectable option 512 that may be selected by the user to initiate continuous playback of select messages of the thread. Before selecting option 512, the user may use one or more tools provided by GUI 500 to select one or more video messages to be included in the continuous playback initiated by a user selection of option 512. In certain embodiments, the user may select certain video messages included in the thread by selecting individual checkboxes 514 (e.g., checkboxes 514-1 through 514-3) that are displayed adjacent to the corresponding visual indicators 504 of video messages included in the thread. Additionally or alternatively, the user may select a "select all" checkbox 516 to conveniently select all of the video messages included in the thread, or the user may select a "clear all" checkbox 518 to conveniently clear the selection of all of the video messages included in the thread.

Using the above-described video message playback tools, a user is able to conveniently and/or intuitively initiate individual and/or continuous playback of one or more video messages included in the thread. When the user initiates continuous playback of multiple video messages included in the thread, system 100 may process the multiple video messages to produce continuous playback of the multiple video messages for viewing by the user. The processing may include stitching together the multiple video messages, as described herein.

Playback of one or more video messages included in the thread may be presented in a video window 520. The playback may also include broadcast of audio content associated with the video content. GUI 500 may also provide one or more playback control tools 522 for use by the user to control the playback of the video content in video window 520.

GUI 500 may provide one or more tools for creating standalone video content from one or more video messages included in the thread. The creation of the video content may include stitching together multiple video messages included in the thread to form a single standalone video (e.g., a single video file) that includes the video content of the multiple video messages. The video may be "standalone" in that the video may be played back independently of the video messaging service and/or the video message data 112 maintained by system 100. To this end, the standalone video may include copies of multiple video messages stitched together. The standalone video may also include or be associated with a viewing application capable of playing back the standalone video for viewing by a user. Accordingly, the standalone video may be easily shared with one or more users in any of the ways described herein regardless of whether the one or more users have access to the video messaging service.

As shown in FIG. 5, GUI 500 may include a selectable option 524 that may be selected by the user to initiate creation of a standalone video that includes all of the video messages of the thread. GUI 500 may additionally or alternatively include a selectable option that may be selected by the user to initiate creation of a standalone video that includes user-selected video messages of the thread. Before selecting option 526, the user may select one or more of the video messages included in the thread, as described above.

GUI 500 may include one or more tools configured to facilitate sharing of video messages and/or standalone video content created from video messages with one or more other users. The sharing may be accomplished through any suitable video sharing service or platform, such as a social media service or platform that is independent of the video messaging service. The sharing of the video content may include stitching together multiple video messages included in the thread to form a standalone video (e.g., a single video file) that may be shared through a video sharing service or platform. As shown in FIG. 5, GUI 500 may include a selectable option 528 that may be selected by the user to initiate sharing of all of the video messages included in the thread. Additionally or alternatively, GUI 500 may include a selectable option 530 that may be selected by the user to initiate sharing of user-selected messages. Before selecting option 530, the user may select one or more of the video messages included in the thread to be shared, as described above.

Thus, GUI 500 may facilitate user interaction for consumption of one or more video messages included in a video communications thread. The consumption may include, playback of one or more of the video messages, creation of standalone video content from one or more of the video messages, and/or sharing of one or more of the video messages and/or standalone video content created from one or more of the video messages by way of a video sharing service or platform.

User interface facility 104 may provide one or more tools for use by a user to create a video message to be exchanged by way of the video messaging service. Such tools may be accessed by the user in any suitable way, including by the user selecting an option 532 in GUI 500 to trigger a launch of one or more tools configured to facilitate creation of a new video message in the video communications thread that is the current focus of GUI 500. In response to the user selection of option 532, user interface facility 104 may provide one or more video message creation tools.

Figure 6:
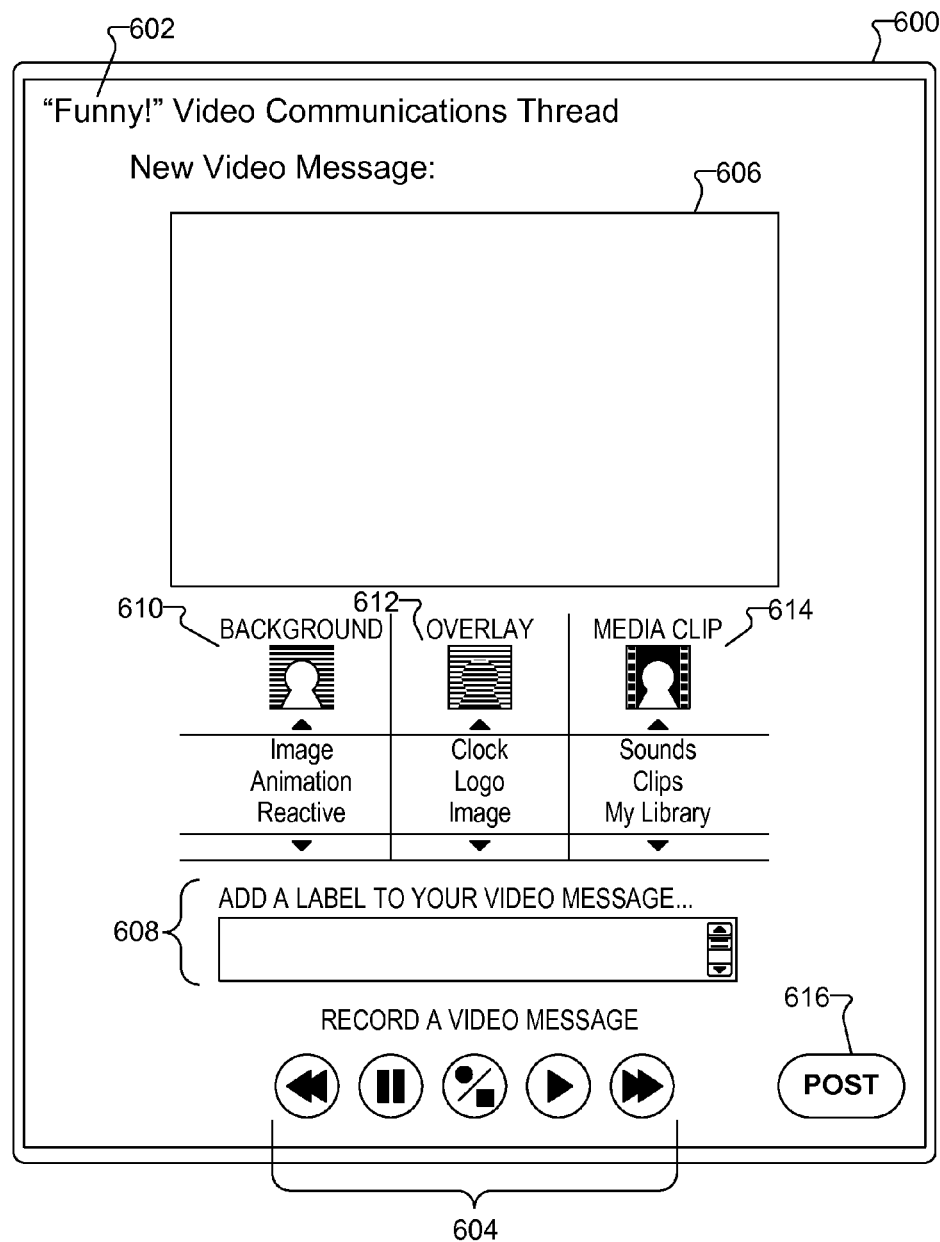

To illustrate, user interface facility 104 may present a GUI 600 shown in FIG. 6 and configured to facilitate user creation of a new video message for addition to a video communications thread. As shown, GUI 600 may include a visual indicator 602 of a video communications thread (e.g., a thread titled "Funny!") that is the current focus of GUI 600 and to which a video message created using GUI 600 may be added.

GUI 600 may provide one or more video recording tools 604 for use by the user to record a new video message. Using tools 604, the user may start and stop recording of a new video message. User interface facility 104 may include and/or be configured to interface with a video camera of a user device such that the video camera may capture video content and user interface facility 104 may record the video content as data stored in storage facility 108. The video content being recorded may be presented live in video window 606 such that the user is able to see the video content as it is being recorded. In addition, the user may use tools 604 to play back, fast forward, rewind, pause, and resume playback of recorded video content in video window 606. Accordingly, the user may review, modify (e.g., record over), add to, and/or delete a new video message.

GUI 600 may also provide one or more tools for use by the user to provide additional information related to a recorded video message. For example, GUI 600 may include a video message label tool 608 configured to allow the user to provide a text label for the new video message.

GUI 600 may also provide one or more video augmentation tools for use by the user to augment a newly recorded video message. For example, GUI 600 may include a video background tool 610 for use by the user to augment a recorded video message with a particular background image. Using background tool 610, the user may select a particular still image or video clip or other animation from a library of images for insertion in the recorded video message. The library of background images may include images provided by system 100 and/or user-generated images provided by the user.

To illustrate, the recorded video message may include video of the user talking. The user may be within a particular recording environment that is captured in the video message. However, the user may want a different background (other than the recording environment) to be shown when the video message is played back by one or more other users. For instance, the user may record the video message in a home environment but may want a work environment background to be shown when the video messaged is played back by one or more coworkers. The user may use background tool 610 to add a custom work environment background to the recorded video message.

Alternatively, the user may select that the background of the recorded video message be automatically selected by system 100 based on one or more attributes of the recorded video message. This selection may be made by the user selecting a "reactive" option within background tool 610. With the "reactive" option selected, system 100 may analyze the recorded video image, determine one or more attributes of the recorded video message based on the analysis, and select a particular background based on one or more attributes of the recorded video message. To illustrate, system 100 may select a particular image or a particular color of background based on a determination that the user is angry (e.g., the user is yelling, talking louder than a predetermined threshold, etc.) in the recorded video message. As another example, system 100 may select a particular image based on particular words used by the user in the recorded video message. For instance, system 100 may select an image of a beach as a background image if words related to beach environment (e.g., beach, towel, sand, ocean, waves, etc.) are mentioned with at least a predetermined frequency in the recorded video message.

System 100 may add a selected background to the recorded video image in any suitable way. For example, system 100 may be configured to analyze a recorded video message to identify portions of the image that include the user's body. These portions may then be isolated and combined with a selected background image to form a recorded video message that appears as if the user recorded the video message within the environment of the selected background image.

GUI 600 may additionally or alternatively include a video overlay tool 612 for use by the user to augment a recorded video message with a particular overlay image. Using overlay tool 612, the user may select a particular still image or video clip from a library of images to be overlaid on the recorded video message. The library of overlay images may include images provided by system 100 and/or user-generated images provided by the user. For example, the library of overlay images may include images of a clock, another time counter, a logo, an avatar, and any other images that may be selected as an overlay image for a video message.

In certain embodiments, system 100 may provide one or more tools for use by the user to indicate a screen position of an overlay image. System 100 may additionally or alternatively provide one or more tools for use by the user to customize a screen size of an overlay image. Accordingly, the user may customize the size and/or position of a selected overlay image based on the video message recorded by the user.

GUI 600 may additionally or alternatively include a media addition tool 614 for use by the user to augment a recorded video message with a particular media clip. Using media addition tool 614, the user may select a particular media clip (e.g., a sound or video clip) from a library of media to be added to the recorded video message. The library of media may include media clips (e.g., sound and/or video emoticons) provided by system 100 and/or user-generated media clips provided by the user (e.g., sound and/or video emoticons that have been prerecorded by the user, such as video clips of the user laughing, acting sad, acting angry, acting surprised, etc.).

System 100 may provide one or more options for how selected media may be added to a recorded video message. In certain embodiments, for example, system 100 may provide one or more tools for use by the user to indicate a specific temporal position within a video message that a media clip is to be inserted. To illustrate, the user may indicate that a media clip of the user laughing is to be inserted after a specific portion of a recorded video message that the user believes is funny. In certain embodiments, system 100 may additionally or alternatively provide one or more tools for use by the user to indicate a specific screen position at which a media clip is to be overlaid to generate a picture-in-picture effect of the media clip within the recorded video message. Alternatively, system 100 may provide one or more tools for use by the user to overlay the recorded video message on the media clip to generate a picture-in-picture effect of the recorded video message within the media clip (e.g., to allow the recorded video message to present the user's commentary about the media clip concurrently with playback of the media clip) and/or to insert the recorded video message at a temporal position within the media clip.

System 100 may allow one or more of the tools described above to be used by the user to augment one or more video messages included in a video communication thread. For example, the user may select a particular video message from the thread and utilize background tool 610 to apply a select background image to the video message, overlay tool 612 to apply a select overlay image to the video message, and/or media addition tool 614 to apply a select media clip to the video message.

In certain embodiments, a media clip, which may be selected by the user utilizing media addition tool 614, may include any of the video messages included in the video communications thread of current focus. Accordingly, the user may select a particular video message from the thread and utilize one or more tools provided by system 100 to augment the video message. In certain examples, the user may record and apply a recorded video message to a selected video message included in the thread, such as by overlaying a video message recorded by the user onto a screen position of the selected video message to provide commentary about the selected video message in picture-in-picture format or by inserting the video message recorded by the user into a temporal position within the selected video message.

After the user is finished creating a new video message, the user may select option 616 to post or otherwise add the new video message to the video communication thread of current focus. Video messaging facility 102 may then process the new video message as described above such that the new video message is exchanged between users and associated with the thread.

Figure 7:
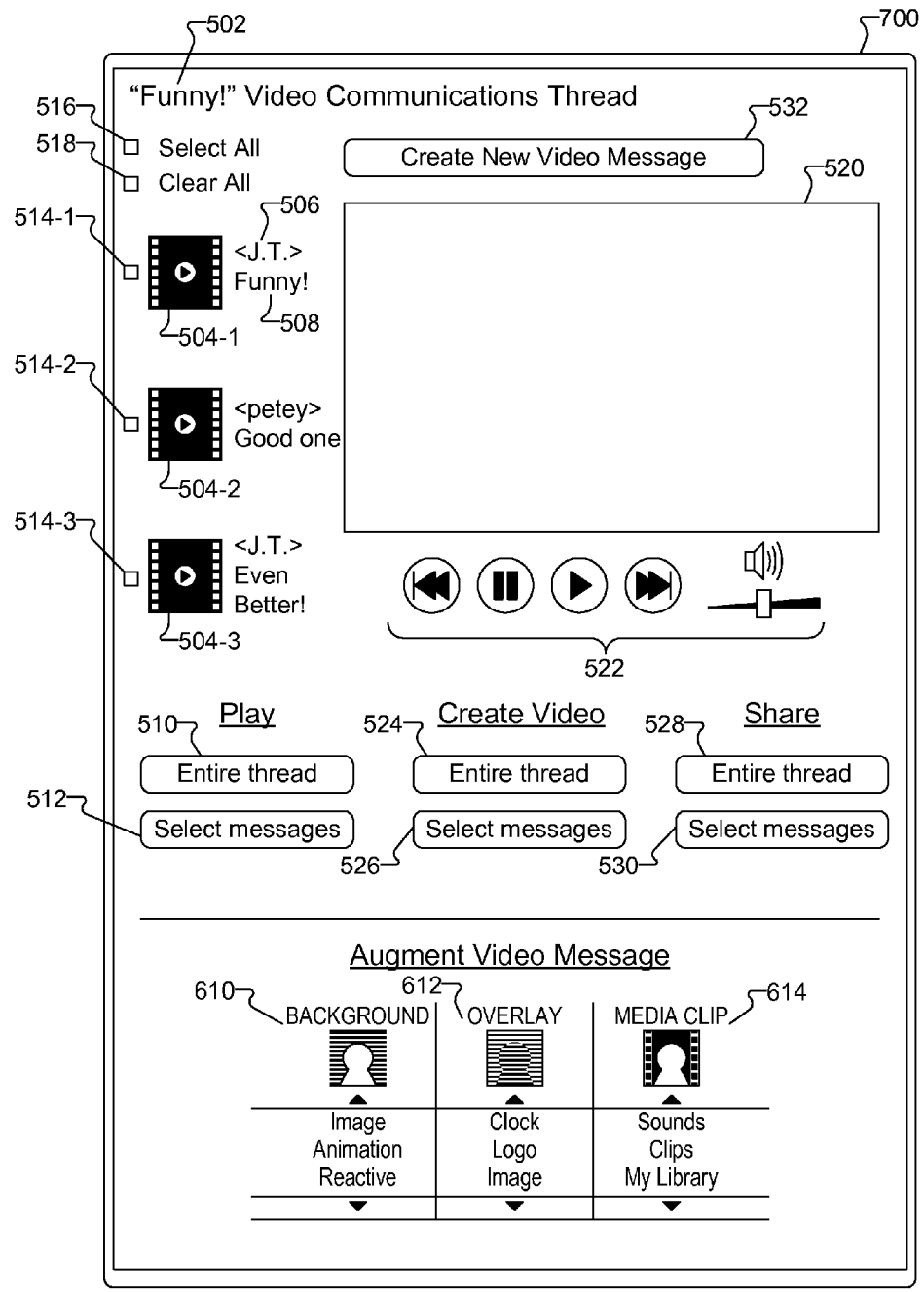

The GUIs shown in FIGS. 5-6 are illustrative only. Other GUIs may be presented in other embodiments. For example, FIG. 7 illustrates another exemplary GUI 700 that includes a combination of certain elements of GUI 500 and GUI 600 into a single window. A user may utilize one or more tools included in GUI 700 to consume one or more video messages included in a video communication thread in any of the ways described above. In addition, the user may utilize one or more video augmentation tools included in GUI 700 to augment a video message included in the thread in any of the ways described herein. For example, the user may initiate playback of a video message included in the thread. While the video message is being presented in video window 520, the user may utilize one or more of the video augmentation tools in GUI 700 to augment the video message, such as by adding a background image, an overlay image, and/or a media clip to the video message at a particular temporal position that coincides with the playback of the video message. For instance, at a particular temporal position during playback of the video message, the user may select to add a select background image, overlay image, or media clip. In certain implementations, user interface facility 104 may provide one or more "hot keys" or other convenient user input mechanisms associated with particular background images, overlay images, and/or media clips to facilitate convenient and timely augmentation of a video message by the user during playback of the video message.

In certain examples, after the user has augmented a video message, the user may direct system 100 to post the augmented video message as a new video message in the video communication thread. In other alternative examples, system 100 may allow the user to cause the augmented video message to replace the previous version of the augmented video message video message in the thread.

In certain embodiments, system 100 may be configured to allow the user to create a temporary video channel around the video communication thread of current focus. The user may choose to allow one or more other users (e.g., social contacts of the user) to add video content (e.g., stitch in video content) and/or modify video content included in the channel. Accordingly, the group of users may use the temporary channel to conduct a video discussion about or otherwise related to the video communication thread.

Figure 8:
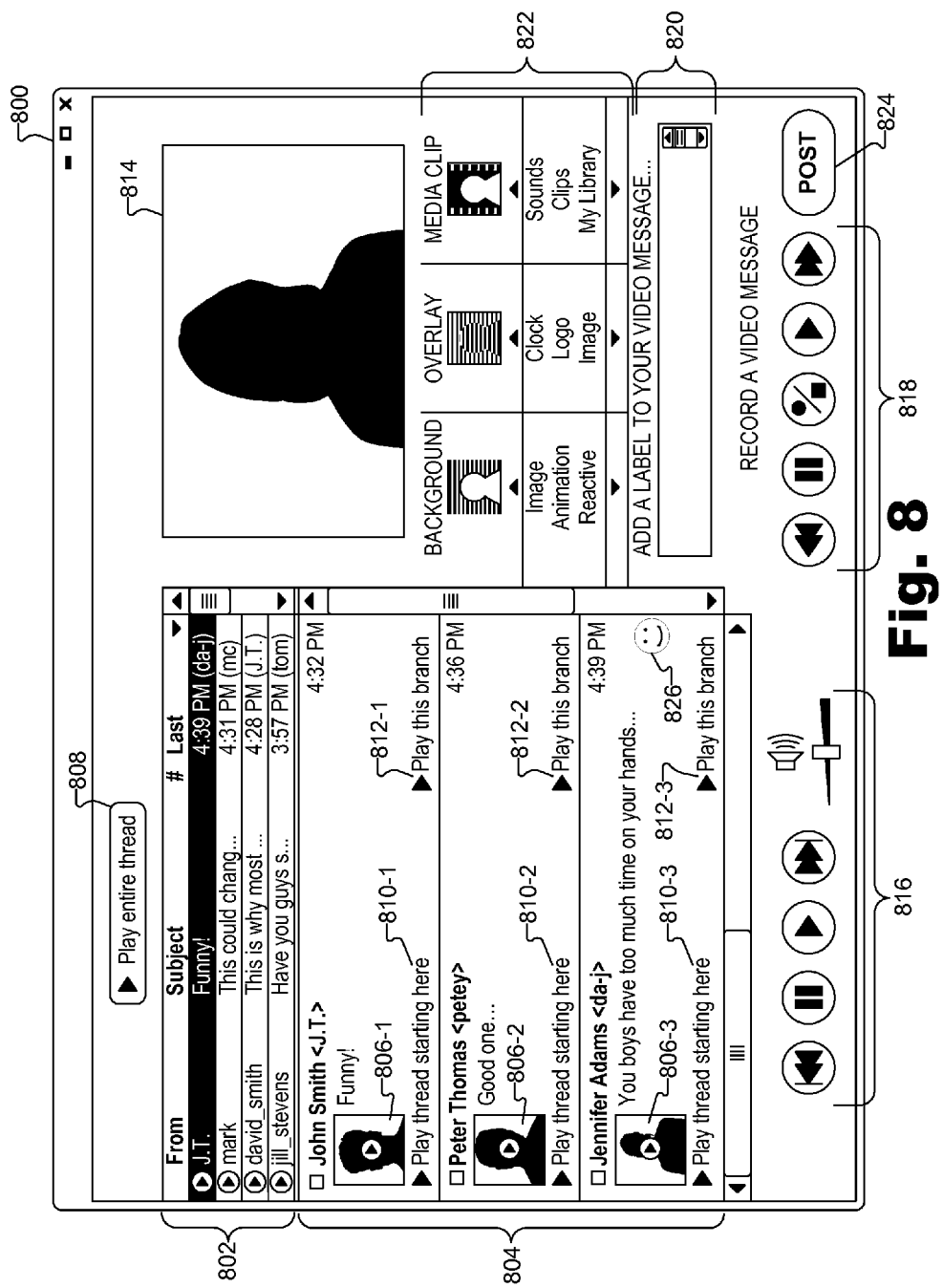

FIG. 8 illustrates another exemplary GUI 800 that may be provided by user interface facility 104. As shown, GUI 800 may include a thread display section 802 that presents data representative of one or more video communication threads to which a user of a video messaging service has access. The user may select a particular video communication thread from the list of video communication threads included in section 802. GUI 800 may also include a video message display section 804 that presents data representative of one or more video messages included in the selected video communication thread. In the illustrated example, a video communication thread having a subject titled "Funny!" Is selected in section 802, and data representative of at least some of the video messages included in the selected thread are presented in section 804.

GUI 800 may include one or more tools for use by the user to consume one or more of the video messages included in the selected thread. For example, GUI 800 may include selectable icons 806 (e.g., icons 806-1 through 806-3), each of which may be individually selected to initiate individual playback of the corresponding video message represented by the selected icon 806. As another example, GUI 800 may include a selectable option 808 that may be selected by the user to initiate continuous, threaded playback of all of the video messages included in the selected thread.

As another example, GUI 800 may include selectable options 810 (e.g., options 810-1 through 810-3), each of which may be selected by the user to initiate continuous playback at least a portion of the selected thread beginning at the particular video message corresponding to the selected option 810. For example, in response to a user selection of option 810-2 associated with a video message posted by username "petey" and titled "Good one . . . ," system 100 may initiate continuous playback of one or more video messages included in the selected thread beginning with the corresponding video message and continuing until a last message included in the selected thread (e.g., the last video message posted in the thread) is played back as part of the continuous playback.

As yet another example, GUI 800 may include selectable options 812 (e.g., options 812-1 through 812-3) each of which may be selected by the user to initiate continuous playback of an entire branch of video messages in which the particular video message corresponding to the selected option 812 belongs. For example, in response to a user selection of option 812-2 associated with a video message posted by username "petey" and titled "Good one . . . ," system 100 may initiate continuous playback of the particular branch of video messages that includes the video message. The playback may begin with the first video message in the branch and continue until a last message included in the same branch is played back as part of the continuous playback.

Playback of one or more video messages may be presented in video window 814. GUI 800 may include one or more playback control tools 816 for use by the user to control the playback of one or more video messages in playback window 814.

As shown in FIG. 8, GUI 800 may further include one or more video recording tools 818 for use by the user to record a new video message to be added to the selected video communication thread, a video label tool 820 configured to be used by the user to add a text label to a video message, and one or more video augmentation tools 822 configured to be used by the user to augment a video message, such as described herein. GUI 800 may also include an option 824 configured to be selected by the user to initiate posting of a new video message to the selected video communication thread.

As shown in FIG. 8, GUI 800 may present data representative of one or more video messages included in the selected video communications thread in list format in video message display section 804. In other embodiments, a user interface provided by user interface facility 104 may present data representative of one or more video messages included in a video communications thread in other forms, such as in a form that is visually representative of relationships between video threads included in the thread. For example, the visual representation of thread 200 shown in FIG. 2 or FIG. 3 may be displayed in a GUI provided by user interface facility 104, such as in the video message display section 804 of GUI 800. Such a view may be intuitive and useful to a user wanting to consume one or more video messages included in a thread.

Returning again to FIG. 1, video processing facility 106 may be configured to perform one or more operations on video communications thread data 110 and/or video message data 112 (e.g., on video message content and/or metadata). For example, processing facility 106 may perform, without limitation, one or more operations related to user consumption (e.g., playback) of one or more video messages, augmenting of one or more video messages, creation of video content from one or more video messages, sharing of video content and/or one or more video messages, associating of one or more video messages with a video communications thread, and analyzing one or more video message included in a video communications thread.

Processing facility 106 may be configured to perform one or more operations in response to a user input command provided by a user by way of a user interface provided by user interface facility 104. The user input command may be provided by the user in any suitable way, including by selecting or otherwise using any of the exemplary user interface tools described herein.

In certain embodiments, processing facility 106 may be configured to stitch together multiple video messages included in a video communications thread. The stitching, which may be performed in any suitable way, may include any combining of multiple video messages. In certain examples, the stitching may include linking or otherwise associating multiple video messages. For instance, multiple independent video messages may be linked together such as by creating pointers or other links between the video messages. In other examples, the stitching may include splicing multiple video messages together or otherwise combining data representative of the multiple video messages into standalone video content such as a single standalone video file. For such splicing, processing facility 106 may create copies of the multiple video messages and use the copies for splicing to create the standalone video content.

The stitched together video messages may span any number of message layers included in a video communications thread. In certain examples, the stitched together video messages span multiple message layers and/or multiple reply message layers of a thread. To illustrate, if processing facility 106 stitches together all of the video messages 202 included in thread 200 shown in FIG. 3, the stitched together video messages 202 will span multiple message layers 302 and multiple reply message layers 306 of the thread 200. In certain examples, stitched together video messages may include all of the video messages included in a thread. In other examples, stitched together video messages may include a user-selected subset of the video messages included in the thread.

The stitching together of multiple video messages included in a video communications thread may be performed to facilitate further processing of the stitched together video messages. For example, stitched together video messages may be used by processing facility 106 for continuous playback of the multiple video messages, creation of standalone video content such as a single standalone video file, and/or sharing of the standalone video content and/or multiple video messages with one or more other users via a video sharing service. Accordingly, in certain examples, continuous playback of multiple video messages, creation of standalone video content from multiple video messages, and sharing of standalone video content or multiple video messages may each span multiple message layers and/or multiple reply message layers of a video communications thread.

In certain examples, the stitching together of multiple video messages by processing facility 106 may be performed in response to a user input command received by way of a user interface provided by user interface facility 104. In other examples, the stitching together of multiple video messages may be performed in advance and/or in preparation for receipt of an anticipated user input command. For example, as video messages are associated with a video communications thread, processing facility 106 may be configured to stitch together the video messages included in the thread such that the stitched together video messages are readily available for processing, such as continuous threaded playback and/or sharing, should a user request such processing of the video messages.

Processing of video communications thread data 110 and/or video message data 112 by video processing facility 106 may include pre-processing operations performed prior to exchanging (e.g., sending, posting, etc) a video message by way of a video messaging service. For example, processing facility 106 may perform one or more pre-processing operations in relation to user creation of a new video message to be exchanged by way of the video messaging service. Examples of such operations may include recording a new video message, augmenting the new video message (e.g., by adding a select background image, overlay image, and/or media clip to the new video message), and providing the new video image to video messaging facility 102 for exchange by way of the video messaging service.

Processing of video communications thread data 110 and/or video message data 112 by video processing facility 106 may additionally or alternatively include post-processing operations performed after a video message has been exchanged by way of a video messaging service. For example, processing facility 106 may perform one or more post-processing operations in relation to a user consuming one or more video messages included in a video communication thread. Examples of such operations may include stitching together multiple video messages, continuously playing back multiple video messages, creating standalone video content from multiple video messages, and/or sharing video messages by way of a video sharing service.

Processing facility 104 may be configured to analyze video messages included in a video communications thread. Processing facility 104 may use the analysis to provide one or more features and/or functions described herein. For example, processing facility 104 may be configured to analyze a video message to determine and assign one or more attributes to the video message. Processing facility 104 may then use the attributes to provide one or more features and/or functions.

To illustrate, as mentioned above, processing facility 104 may be configured to analyze a video message to determine a mood of a user who created the video message. For instance, processing facility 104 may analyze audio content (e.g., tone of voice, volume of voice, words spoken, etc.) and/or video content (e.g., a user's body language such as the user's facial expressions, hand gestures, etc.) included in the video message and compare the analyzed data with a mood determination heuristic to determine, from a list of possible moods, a mood of the user who created the video message. As an example, processing facility 104 may determine, based on the analysis and the heuristic, that the user was angry when the user recorded the video message. In response, processing facility 104 may assign an attribute of "angry" to the video message for use in providing one or more features or functions of a video messaging service. For instance, user interface facility 104 may be configured to detect that an "angry" attribute has been assigned to the video message and display a visual indicator (e.g., a red icon, a flame icon, etc.) to indicate that the user who posted the video message was angry when the user recorded the video message. FIG. 8 illustrates an exemplary visual indicator 826 indicating that the video message provided by username "da-j" and titled "You boys have too much time on your hands . . ." has been assigned an attribute indicating that processing facility 106 determined the user to be "jovial," "laughing," or "happy" when recording the video message. A different visual indicator may be presented to indicate a different determined mood, such as when processing facility 106 determines a user to be angry in a video message. In this or a similar manner, system 100 may provide automatic feedback to a video message associated with a thread.

Figure 9:
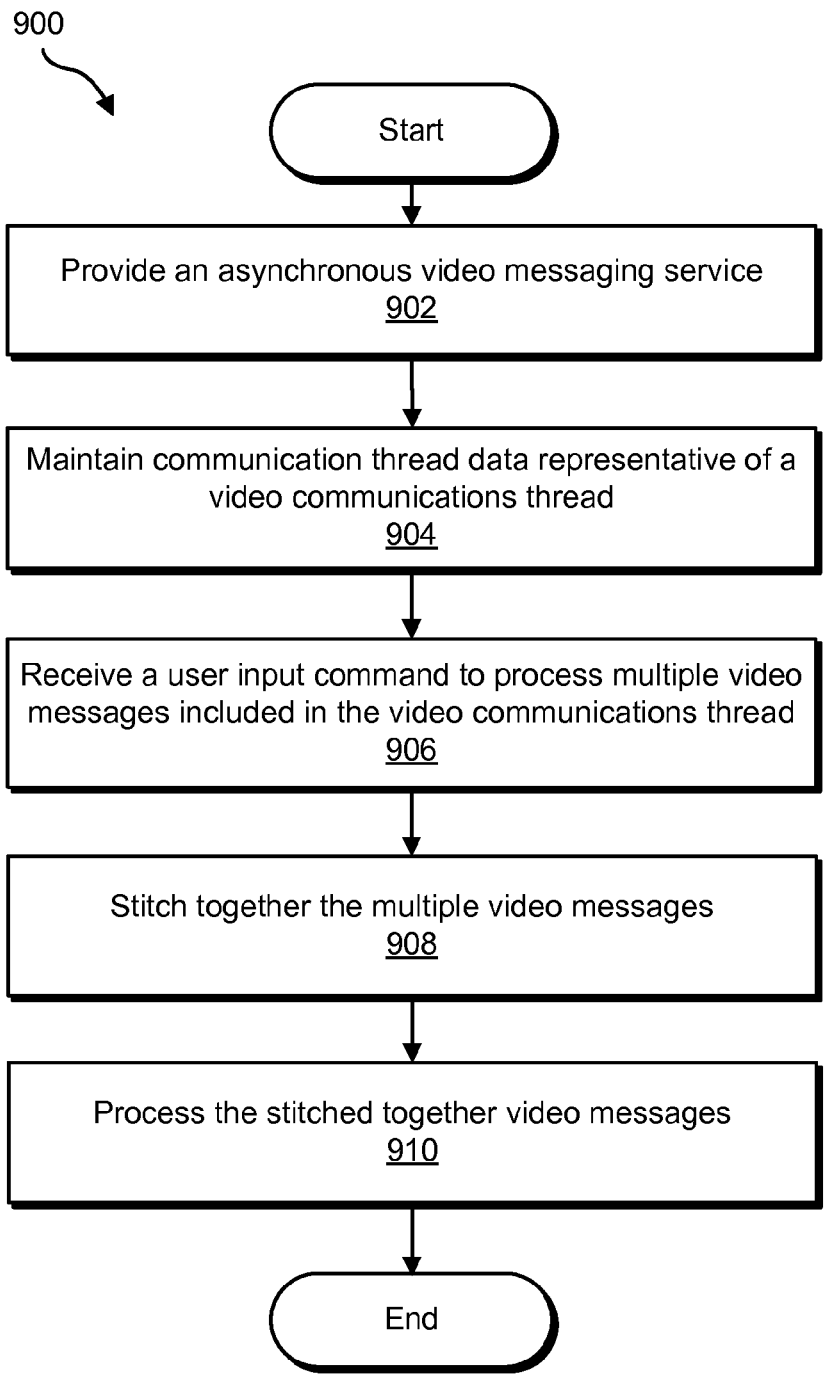
FIGS. 9-10 illustrate exemplary video messaging methods according to principles described herein.

FIG. 9 illustrates an exemplary video messaging method 900 according to principles described herein. While FIG. 9 illustrates exemplary steps according to certain embodiments, other embodiments may omit, add to, reorder, combine, and/or modify any of the steps shown in FIG. 9. In certain embodiments, one or more of the steps shown in FIG. 9 may be performed by system 100 and/or any components and/or implementation thereof.

In step 902, system 100 provides an asynchronous video messaging service, such as described herein.

In step 904, system 100 maintains communication thread data representative of a video communications thread associated with the video messaging service. As described herein, the video communications thread may include a plurality of video messages exchanged between users of the video messaging service.

In step 906, system 100 receives a user input command to process multiple video messages included in the video communications thread. The user input command may be received in any of the ways described herein, such as by a user selecting an option or tool included in a user interface provided by system 100.

In step 908, system 100 stitches together the multiple video messages. In certain examples, system 100 may stitch together the multiple video messages for use in processing the multiple video messages in response to user input command, such as described herein.

In step 910, system 100 processes the stitched together video messages. The processing may include any of the operations and/or may be performed in any of the ways described herein. For example, system 100 may use the stitched together video messages to continuously play back multiple video messages, create standalone video content from multiple video messages, and/or share the standalone video content and/or multiple video messages by way of a video sharing service.

Figure 10:
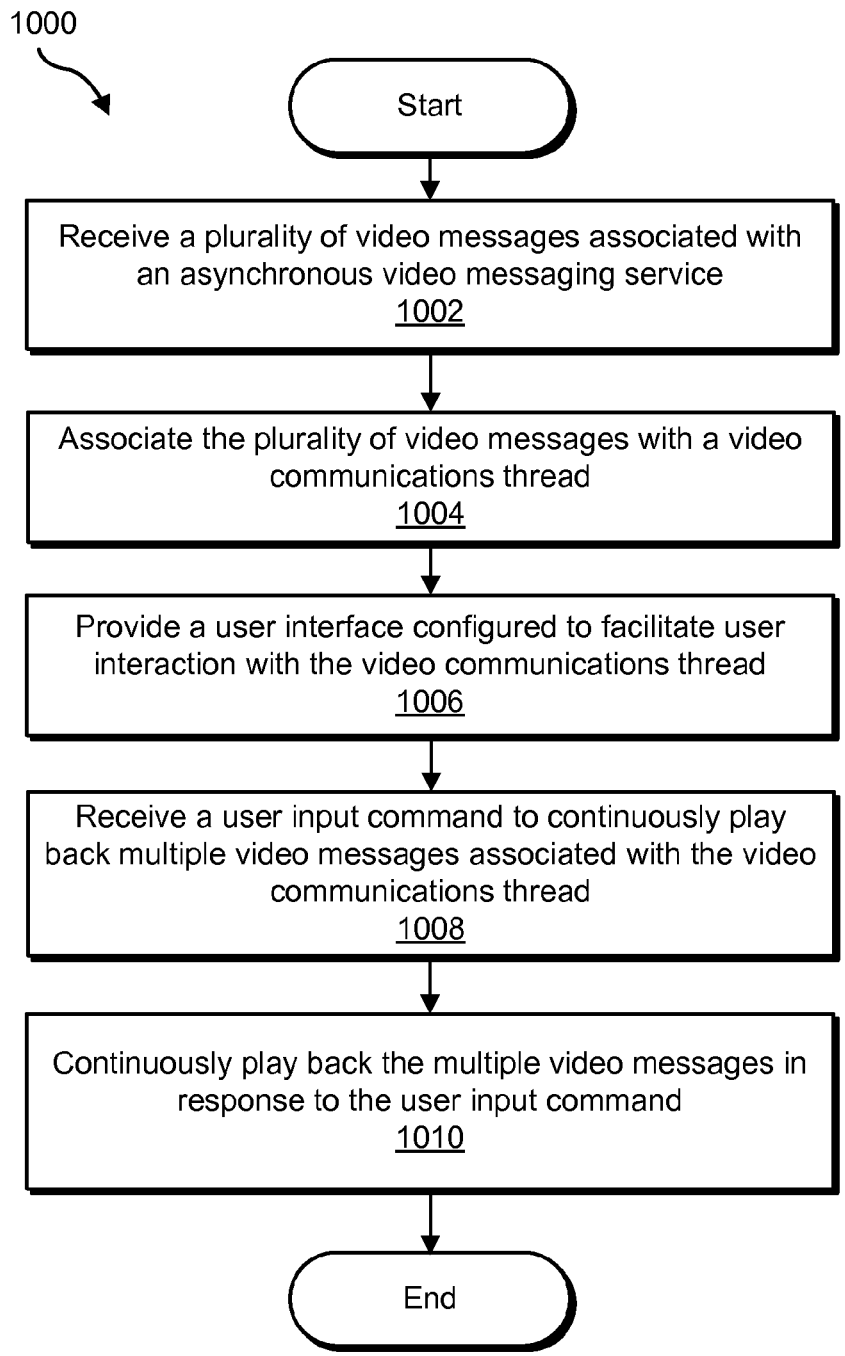

FIG. 10 illustrates another exemplary video messaging method 1000 according to principles described herein. While FIG. 10 illustrates exemplary steps according to certain embodiments, other embodiments may omit, add to, reorder, combine, and/or modify any of the steps shown in FIG. 10. In certain embodiments, one or more of the steps shown in FIG. 10 may be performed by system 100 and/or any components and/or implementation thereof.

In step 1002, system 100 receives a plurality of video messages associated with an asynchronous video messaging service. The plurality of video messages may be provided by a plurality of users of the video messaging service for exchange between the users of the video messaging service, such as described herein.

In step 1004, system 100 associates the plurality of video messages with a video communications thread associated with the video messaging service. The association of the video messages with the video communications thread may be performed in any of the ways described herein.

In step 1006, system 100 provides a user interface configured to facilitate user interaction with the video communications thread, such as described herein.

In step 1008, system 100 receives a user input command to continuously play back multiple video messages associated with the video communications thread. The user input command may be received in any of the ways described herein.

In step 1010, system 100 continuously plays back the multiple video messages in response to the user input command. In certain examples, the continuous playback of the multiple video messages may span multiple message layers and/or multiple reply message layers of the video communications thread. In certain examples, the continuous playback of the multiple video messages may span all of the video messages associated with the thread or a user-selected subset of the video messages associated with the thread.

For the continuous playback of the multiple video messages performed in step 1010, system 100 may stitch together the multiple video messages in a manner that allows each transition from playback of one video message to playback of the next the message to be seamless and to visually appear as a cut from one video camera view to another video camera view.

Figure 11:
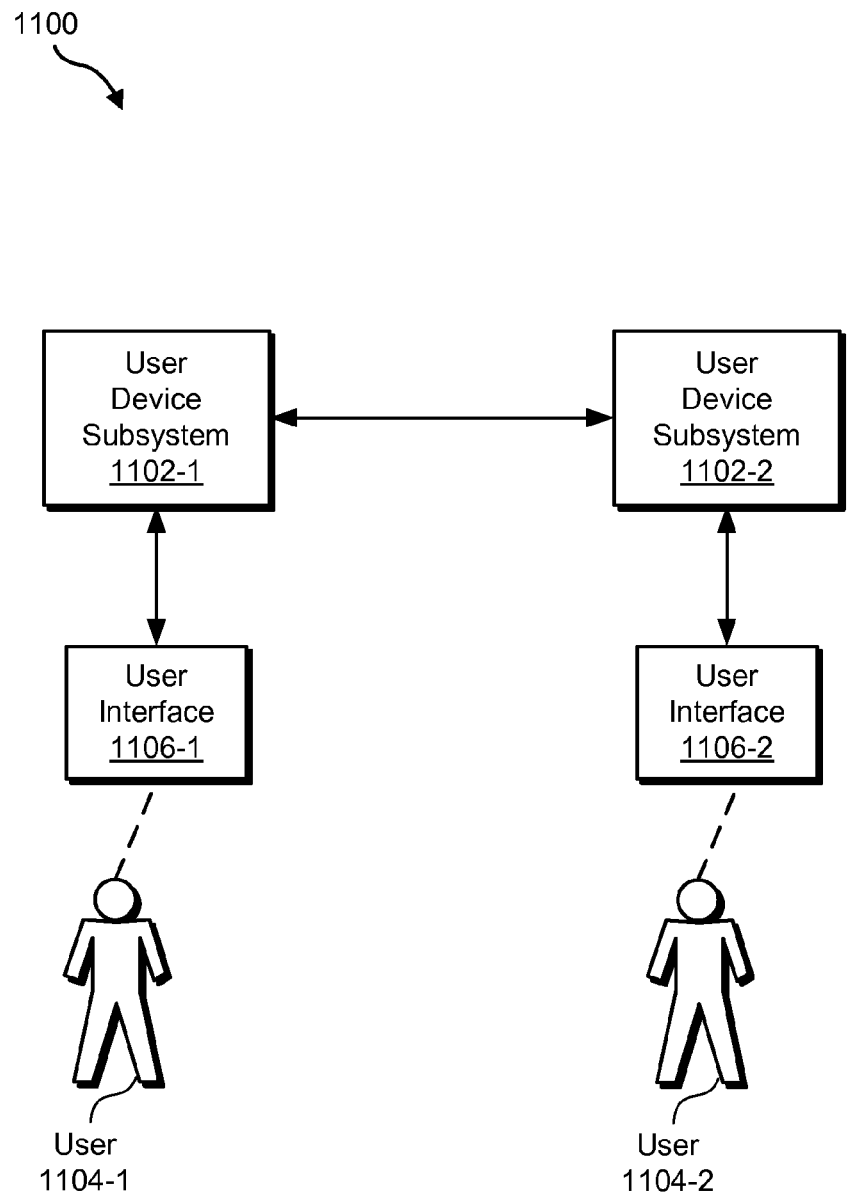
FIGS. 11-12 illustrate exemplary implementations of the system of FIG. 1 according to principles described herein.

FIG. 11 illustrates an exemplary implementation 1100 of system 100 wherein a user device subsystem 1102-1 and another user device subsystem 1102-2 (collectively "user device subsystems 1102") are configured to communicate directly with one another to exchange video messages by way of an asynchronous video messaging service. In implementation 1100, video messaging facility 102, user interface facility 104, video processing facility 106, and storage facility 108 may be implemented by each user device subsystem 1102. Accordingly, each user device subsystem 1102 may perform any of the operations of video messaging facility 102, user interface facility 104, video processing facility 106, and storage facility 108. In certain embodiments, one or more of video messaging facility 102, user interface facility 104, and video processing facility 106 may be implemented as one or more applications (e.g., software and/or firmware applications) executing on one or more user devices included in each user device subsystem 1102.

Each user device subsystem 1102 may include or be implemented by one or more physical computing devices configured to provide an asynchronous video message service for use by one or more end users of the service to exchange video messages. For example, a user device subsystem 102 may include or be implemented by a set-top box device, a digital video recording device, a mobile phone device, a media player device, a gaming device, a personal computer, any other computing device, and/or any combination or sub-combination thereof.

As shown in FIG. 11, user device subsystem 1102-1 may be associated with (e.g., operated by) a user 1104-1, and user device subsystem 1102-2 may be associated with (e.g., operated by) another user 1104-2. Accordingly, users 1104-1 and 1104-2 (collectively "users 1104") may utilize respective user device subsystems 1102-1 and 1102-2 to exchange video messages by way of an asynchronous video messaging service. In certain examples, the exchanging of video message may be targeted in that a user provides a video message specifically for delivery to one or more other users.

As further shown in FIG. 11, user device subsystem 1102-1 may provide a user interface 1106-1 configured to facilitate interaction by user 1104-1 with user device subsystem 1102-1, and user device subsystem 1102-2 may provide a user interface 1106-2 configured to facilitate interaction by user 1104-2 with user device subsystem 1102-2. Through the respective user interfaces 1106-1 and 1106-2, users 1104-1 and 1104-2 may interact with the video messaging service provided by system 100, including in any of the ways described herein. Each of the user interfaces 1106-1 and 1106-2 may include or provide any of the exemplary GUIs described herein.

Figure 12:
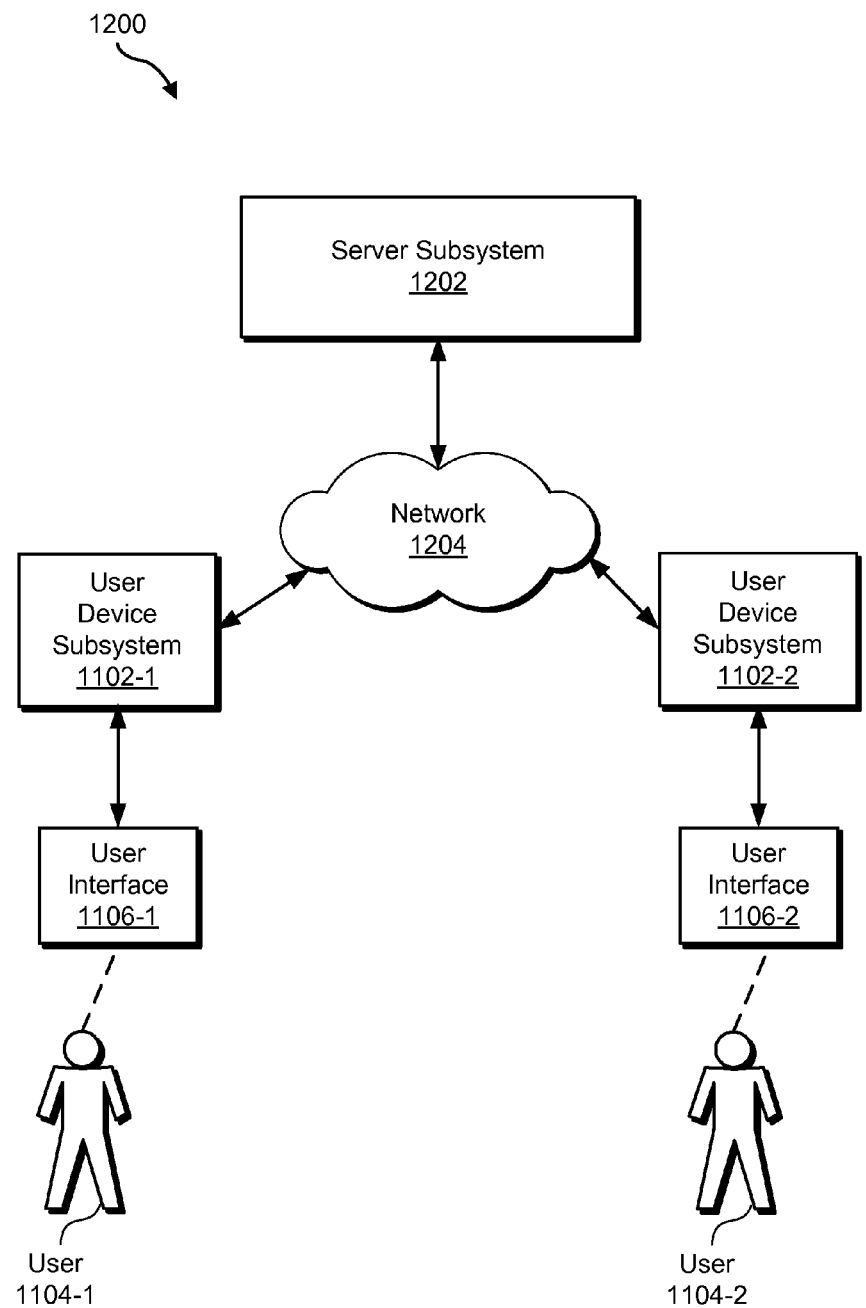

In implementation 1100, system 100 may provide an asynchronous video communications service that supports direct, point-to-point exchange of one or more video messages between user device subsystems 1102. In other implementations, system 100 may provide a video communications service that supports indirect video messaging. For example, FIG. 12 illustrates an exemplary implementation 1200 of system 100 wherein user device subsystem 1102-1 and user device subsystem 1102-2 are configured to communicate with a server subsystem 1202 by way of a network 1204 to indirectly exchange video messages.

In implementation 1200, video messaging facility 102, user interface facility 104, video processing facility 106, and storage facility 108 may each be implemented by user device subsystems 1102 and/or server subsystem 1202. Accordingly, user device subsystems 1102, server subsystem 1202, or a combination thereof may perform any of the operations of video messaging facility 102, user interface facility 104, video processing facility 106, and storage facility 108.

User device subsystems 1102 may communicate with server subsystem 1202 using any suitable communication technologies, including wireless communication technologies that support delivery of video messages from user device subsystems 1102 to server subsystem 1202 and from server subsystem 1202 to user device subsystems 1102 over network 1106. Examples of such communication technologies may include, without limitation, Global System for Mobile Communications ("GSM") technologies, Long Term Evolution ("LTE") technologies, Code Division Multiple Access ("CDMA") technologies, Time Division Multiple Access ("TDMA") technologies, Evolution Data Optimized Protocol ("EVDO") (e.g., "1xEVDO"), radio frequency ("RF") signaling technologies, radio transmission technologies (e.g., One Times Radio Transmission Technology ("1xRTT")), Transmission Control Protocol ("TCP"), Internet Protocol ("IP"), Session Initiation Protocol ("SIP"), Real-Time Transport Protocol ("RTP"), User Datagram Protocol ("UDP"), in-band and out-of-band signaling technologies, and other suitable video data transport technologies, or any combination or sub-combination thereof.

Network 1106 may include any network or combination of networks provided by one or more appropriately configured network devices (and communication links thereto) and over which communications and data may be transported between server subsystem 1202 and user device subsystems 1102. For example, network 1106 may include, but is not limited to, a mobile phone network (e.g., a cellular phone network, an LTE network, a 3G network, a 4G network, etc.), a satellite media network (e.g., a broadcasting network, a terrestrial media broadcasting network), a cable network, an optical fiber network, a hybrid fiber coax network, a wireless network (e.g., a Wi-Fi and/or mobile telephone network), a subscriber television network, a wide area network the Internet, an intranet, a local area network, any other suitable network for transporting video message data as part of an asynchronous video messaging service, and/or any combination or sub-combination of these networks.

Server subsystem 1202 may include one or more computing devices (e.g., one or more server devices) configured to perform functionality of system 100 described herein. The computing devices may include and/or be implemented by one or more network devices of network 1106 and/or may be configured to communicate with one or more network devices of network 1106. In certain examples, the computing devices may be operated by the operator of network 1106 and/or a video messaging service provider.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known non-transitory computer-readable media.

A non-transitory computer-readable medium (also referred to as a processor-readable medium) includes any non-transitory medium that participates in providing data (e.g., instructions) that may be read by a computer (e.g., by a processor of a computer). Such a non-transitory medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of non-transitory computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other non-transitory medium from which a computer can read.

Figure 13:
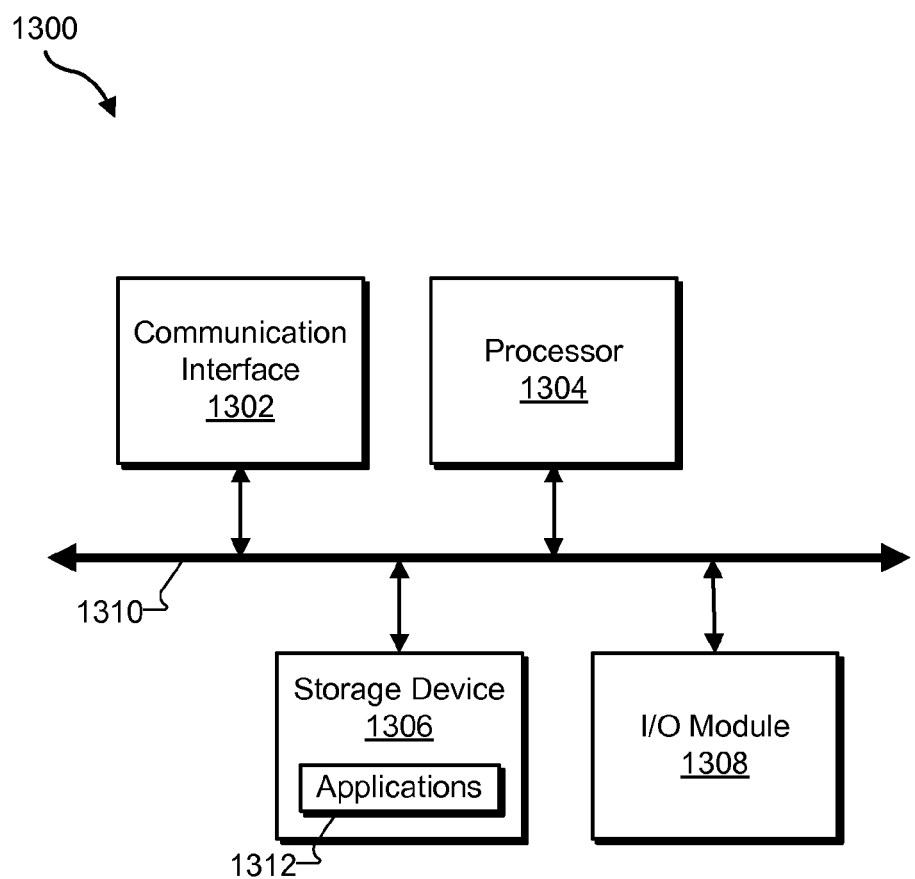
FIG. 13 illustrates an exemplary computing device according to principles described herein.

FIG. 13 illustrates an exemplary computing device 1300 that may be configured to perform one or more of the processes described herein. As shown in FIG. 13, computing device 1300 may include a communication interface 1302, a processor 1304, a storage device 1306, and an input/output ("I/O") module 1308 communicatively connected via a communication infrastructure 1310. While an exemplary computing device 1300 is shown in FIG. 13, the components illustrated in FIG. 13 are not intended to be limiting. Additional or alternative components may be used in other embodiments. Components of computing device 1300 shown in FIG. 13 will now be described in additional detail.

Communication interface 1302 may be configured to communicate with one or more computing devices. Examples of communication interface 1302 include, without limitation, a wireless network interface (such as a wireless network interface card), a modem, and any other suitable interface. Communication interface 1302 may be configured to interface with any suitable communication media, protocols, and formats.

Processor 1304 generally represents any type or form of processing unit capable of processing data or interpreting, executing, and/or directing execution of one or more of the instructions, processes, and/or operations described herein. Processor 1304 may direct execution of operations in accordance with one or more applications 1312 or other computer-executable instructions such as may be stored in storage device 1306 or another non-transitory computer-readable medium.

Storage device 1306 may include one or more data storage media, devices, or configurations and may employ any type, form, and combination of data storage media and/or device. For example, storage device 1306 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1306. For example, data representative of one or more executable applications 1312 (which may include, but are not limited to, one or more of the software applications described herein) configured to direct processor 1304 to perform any of the operations described herein may be stored within storage device 1306. In some examples, data may be arranged in one or more databases residing within storage device 1306.

I/O module 1308 may be configured to receive user input and provide user output and may include any hardware, firmware, software, or combination thereof supportive of input and output capabilities. For example, I/O module 1308 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1308 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1308 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1300. For example, one or more applications 1312 residing within storage device 1306 may be configured to direct processor 1304 to perform one or more processes or functions associated with one or more of the facilities 102-106 of system 100 described herein. Likewise, storage facility 108 of system 100 may be implemented by or within storage device 1306.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
providing, by a video messaging system, an asynchronous video messaging service;
maintaining, by the video messaging system, communication thread data representative of a video communication thread that includes a plurality of video messages exchanged between users of the asynchronous video messaging service;
providing, by the video messaging system, a user interface configured to facilitate user interaction with the video communication thread;
receiving, by the video messaging system by way of the user interface, a plurality of user input commands to process multiple video messages included in the video communication thread, the plurality of user input commands comprising an individual user selection of each of the multiple video messages prior to processing the multiple video messages; and
stitching together, by the video messaging system, the selected multiple video messages for use in processing the multiple video messages in response to the plurality of user input commands.

2. The method of claim 1, wherein the stitched together multiple video messages span multiple hierarchical message layers of the video communication thread.

3. The method of claim 1, wherein the stitched together multiple video messages span multiple hierarchical reply message layers of the video communication thread.

4. The method of claim 1, wherein the stitched together multiple video messages comprise all of the video messages included in the video communication thread.

5. The method of claim 1, wherein the stitched together multiple video messages comprise a subset of the plurality of video messages included in the video communication thread.

6. The method of claim 1, wherein the processing comprises continuously playing back the multiple video messages.

7. The method of claim 6, further comprising playing back, by the video messaging system, the multiple video messages such that each transition from playback of one of the multiple video messages to playback of another of the multiple video messages visually appears as a cut from one video camera view to another video camera view.

8. The method of claim 1, wherein the processing comprises creating a single standalone video file that contains the multiple video messages.

9. The method of claim 8, wherein the stitching together comprises splicing the multiple video messages together to create the single standalone video file that contains the multiple video messages.

10. The method of claim 1, wherein the processing comprises sharing the stitched together multiple video messages by way of a video sharing service.

11. The method of claim 10, wherein the sharing of the stitched together multiple video messages by way of the video sharing service comprises sharing the stitched together multiple video messages by way of a social media platform.

12. The method of claim 1, further comprising:
receiving, by the video messaging system, the plurality of video messages from the users of the asynchronous video messaging service; and
associating, by the video messaging system, the plurality of video messages with the video communications thread.

13. The method of claim 1, further comprising:
analyzing, by the video messaging system, a video message included in the video communications thread;
determining, by the video messaging system, a mood of a user associated with the video message based on the analyzing; and
providing, by the video messaging system, a visual indicator of the mood of the user in the user interface.

14. The method of claim 1, further comprising:
providing, by the video messaging system by way of the user interface, one or more video recording tools for use by a user to record a new video message; and
providing, by the video messaging system by way of the user interface, one or more video augmentation tools for use by the user to augment the new video message with at least one of a select background image, a select overlay image, and a select media clip.

15. The method of claim 1, further comprising:
providing, by the video messaging system by way of the user interface, one or more tools for use by a user to select a video message from the plurality of video messages included in the video communications thread; and
providing, by the video messaging system by way of the user interface, one or more video augmentation tools for use by the user to augment the selected video message with at least one of a select background image, a select overlay image, a select media clip, and a new video message recorded by the user.

16. The method of claim 1, wherein the user interface displays at least one of:
a user-selectable option for initiating continuous threaded playback of all of the video messages included in the video communications thread; and
a user-selectable option for initiating continuous threaded playback of at least a subset of the video messages included in the video communications thread beginning at a particular video message included in the video communications thread.

17. The method of claim 1, embodied as computer-executable instructions on at least one non-transitory computer-readable medium.

18. A method comprising:
receiving, by a video messaging system that provides an asynchronous video messaging service, a plurality of video messages provided by a plurality of users of the video messaging service;
associating, by the video messaging system, the plurality of video messages with a video communications thread;
providing, by the video messaging system, a user interface configured to facilitate user interaction with the video communication thread;
receiving, by the video messaging system by way of the user interface, a plurality of user input commands to continuously play back multiple video messages associated with the video communication thread, the plurality of user input commands comprising an individual user selection of each of the multiple video messages prior to the continuously playing back of the multiple video messages; and
continuously playing back, by the video messaging system in response to the plurality of user input commands, the selected multiple video messages, wherein the continuous playback of the multiple video messages spans multiple hierarchical message layers of the video communications thread.

19. The method of claim 18, wherein the multiple hierarchical message layers of the video communications thread comprise multiple hierarchical reply message layers.

20. The method of claim 18, wherein the continuous playback of the multiple video messages spans all of the video messages associated with the video communication thread.

21. The method of claim 18, wherein the continuous playback of the multiple video messages spans a subset of the plurality of video messages associated with the video communication thread.

22. The method of claim 18, embodied as computer-executable instructions on at least one non-transitory computer-readable medium.

23. A system comprising:
   at least one processor;
   a video messaging facility that directs the at least one processor to maintain communication thread data representative of a video communication thread that includes a plurality of video messages exchanged between users of the asynchronous video messaging service;
   a user interface facility that directs the at least one processor to
      provide a user interface configured to facilitate user interaction with the video communication, and
      receive, by way of the user interface, a plurality of user input commands to process multiple video messages included in the video communication thread, the plurality of user input commands comprising an individual user selection of each of the multiple video messages prior to processing the multiple video messages; and
   a video processing facility that directs the at least one processor to stitch together the selected multiple video messages for use in processing the multiple video messages in response to the plurality of user input commands.

24. The system of claim 23, wherein the video processing facility further directs the at least one processor to use the stitched together multiple video messages to continuously play back the multiple video messages in response to the plurality of user input commands.

25. The system of claim 23, wherein the continuous playback of the multiple video messages spans multiple hierarchical message layers of the video communications thread.

* * * * *